US012605884B2

(12) United States Patent
Ramos et al.

(10) Patent No.: US 12,605,884 B2
(45) Date of Patent: Apr. 21, 2026

(54) HYBRID ADDITIVE MANUFACTURING WITH DUAL PHASE-CHANGE MATERIALS

(71) Applicant: Inkbit, LLC, Medford, MA (US)

(72) Inventors: Javier Ramos, Brookline, MA (US); Richard Woudenberg, Burlington, MA (US); Wojciech Matusik, Lexington, MA (US)

(73) Assignee: Inkbit, LLC, Medford, MA (US)

( * ) Notice: Subject to any disclaimer, the term of this patent is extended or adjusted under 35 U.S.C. 154(b) by 486 days.

(21) Appl. No.: 17/845,600

(22) Filed: Jun. 21, 2022

(65) Prior Publication Data

US 2022/0379547 A1 Dec. 1, 2022

Related U.S. Application Data

(63) Continuation-in-part of application No. 17/330,911, filed on May 26, 2021, now Pat. No. 11,364,680.

(51) Int. Cl.
B29C 64/112 (2017.01)
B29C 64/336 (2017.01)
(Continued)

(52) U.S. Cl.
CPC .......... B29C 64/112 (2017.08); B29C 64/336 (2017.08); B33Y 10/00 (2014.12);
(Continued)

(58) Field of Classification Search
None
See application file for complete search history.

(56) References Cited

U.S. PATENT DOCUMENTS 2,432,688 A * 12/1947 Slack, Jr. ................. A61K 6/20
106/217.7
5,506,607 A 4/1996 Sanders, Jr. et al.
(Continued)

FOREIGN PATENT DOCUMENTS

EP 1915246 B1 6/2016
KR 201800115877 A * 10/2018
WO 20200146800 A1 7/2020

OTHER PUBLICATIONS

MCP (Mallard Creek Polymers, a blog of "Amorphous vs. Crystalline Polymers," published in public on Jul. 10, 2021, available in https://www.mcpolymers.com/library/amorphous-vs-crystalline-polymers). (Year: 2021).*

(Continued)

*Primary Examiner* — Xiao S Zhao
*Assistant Examiner* — Inja Song
(74) *Attorney, Agent, or Firm* — J. Robin Rohlicek

(57) ABSTRACT

A method includes manufacturing a kernel that comprises a quantity of a phase-change material and heating the thermoplastic past a softening temperature thereof. This softening temperature is greater than the phase-change material's melting temperature. The method continues with pressing this heated thermoplastic onto a contact surface of the kernel and the thermoplastic to cool to below its softening temperature. As a result, the thermoplastic assumes a profile that depends, at least in part, on the contact surface's profile. The method continues with separating the kernel from the thermoplastic.

22 Claims, 11 Drawing Sheets

(51) Int. Cl.

| | |
|---|---|
| *B29K 91/00* | (2006.01) |
| *B29L 31/00* | (2006.01) |
| *B33Y 10/00* | (2015.01) |
| *B33Y 70/00* | (2020.01) |
| *B33Y 80/00* | (2015.01) |

(52) U.S. Cl.

CPC .............. *B33Y 70/00* (2014.12); *B33Y 80/00* (2014.12); *B29K 2091/00* (2013.01); *B29K 2995/0039* (2013.01); *B29K 2995/0041* (2013.01); *B29L 2031/757* (2013.01)

(56) References Cited

U.S. PATENT DOCUMENTS

| | | | |
|---|---|---|---|
| 5,740,051 A | | 4/1998 | Sanders, Jr. et al. |
| 5,997,795 A * | | 12/1999 | Danforth ............. B29C 33/3842 |
| | | | 419/36 |
| 9,662,839 B2 * | | 5/2017 | Napadensky ......... B29C 64/314 |
| 10,751,951 B1 | | 8/2020 | Nguyen et al. |
| 10,953,462 B1 * | | 3/2021 | Zenere ...................... B22C 9/22 |
| 2004/0178543 A1 * | | 9/2004 | Fitzell, Jr. ............. B29C 51/261 |
| | | | 264/553 |
| 2006/0257580 A1 * | | 11/2006 | Ranganathan .......... B29C 33/68 |
| | | | 524/35 |

| | | | |
|---|---|---|---|
| 2007/0029693 A1 | | 2/2007 | Wigand et al. |
| 2010/0021638 A1 | | 1/2010 | Varanka et al. |
| 2013/0119577 A1 | | 5/2013 | You et al. |
| 2013/0228953 A1 * | | 9/2013 | Ikeda ...................... B29C 64/40 |
| | | | 264/401 |
| 2015/0258744 A1 | | 9/2015 | Muller et al. |
| 2015/0336299 A1 * | | 11/2015 | Tanugula ........... G05B 19/4093 |
| | | | 264/16 |
| 2016/0333165 A1 | | 11/2016 | Bayer et al. |
| 2017/0158816 A1 | | 6/2017 | Martinoni et al. |
| 2018/0257138 A1 | | 9/2018 | Mark |
| 2018/0264731 A1 | | 9/2018 | Kritchman et al. |
| 2019/0345276 A1 | | 11/2019 | Liska et al. |
| 2019/0366641 A1 | | 12/2019 | Innes |
| 2019/0389123 A1 | | 12/2019 | Parker et al. |
| 2020/0040113 A1 | | 2/2020 | Liska et al. |
| 2020/0232109 A1 | | 7/2020 | Hoffman et al. |
| 2020/0316856 A1 | | 10/2020 | Mojdeh et al. |
| 2021/0002396 A1 | | 1/2021 | Liska et al. |
| 2021/0323216 A1 * | | 10/2021 | Stewart ................. B29C 51/002 |

OTHER PUBLICATIONS

English translation of KR-201800115877-A by EPO. (Year: 2018).*

* cited by examiner

FIG. 1
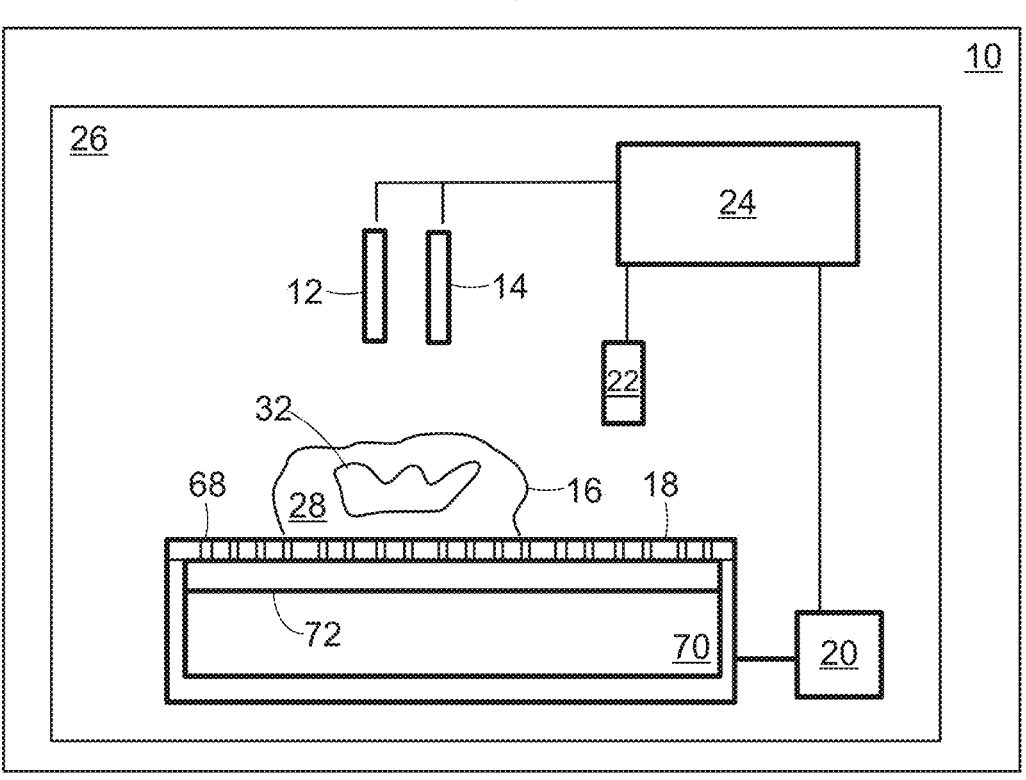
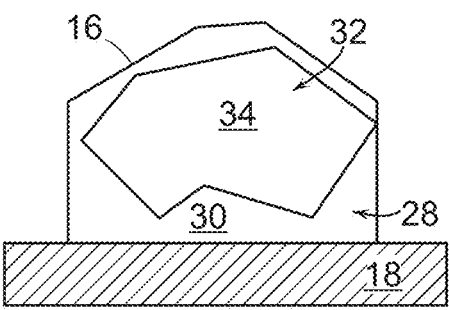
FIG. 2

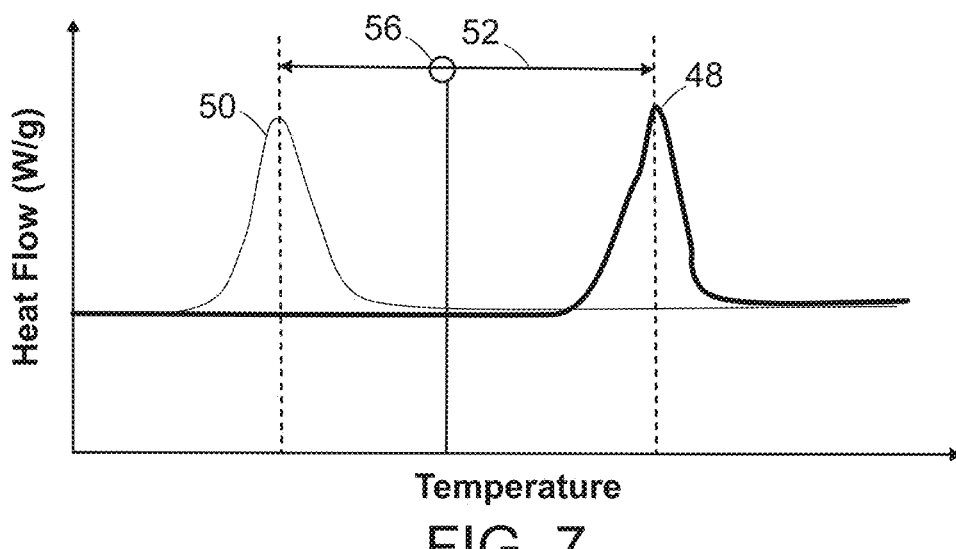
FIG. 7
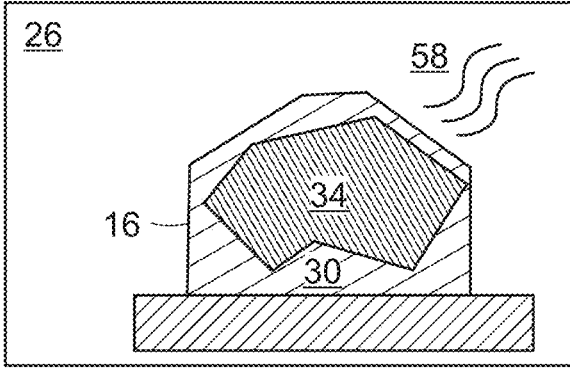
FIG. 8
FIG. 9

FIG. 10

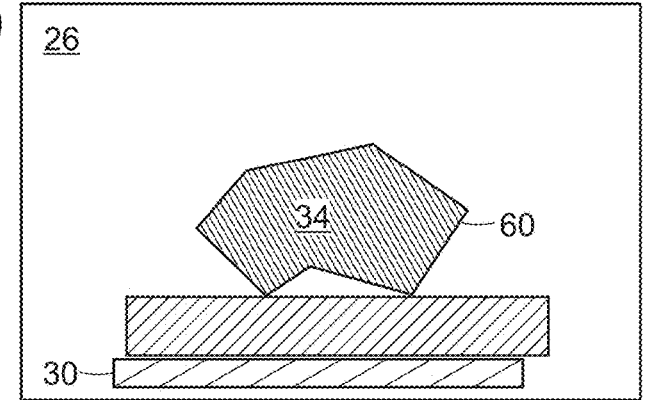

FIG. 11

| Support Wax | Melting Point (°C) | Build Wax | Melting Point (°C) |
|---|---|---|---|
| Lauryl Alcohol | 26 | Unilin 325 | 78 |
| Myristyl Alcohol | 39 | N-methyl-p-toluenesulfonamide | 79 |
| Cetyl Alcohol | 50 | Polywax 400 | 81 |
| Kzester Wax K-385 | 50 | Stearyl Erucamide | 81 |
| Kester Wax K-56 | 56 | Indrawax 185-M | 85 |
| Stearyl Alcohol | 58 | Kester Wax K-82H | 85 |
| Kester Wax K59 | 59 | Polywax 500 | 88 |
| Kester Wax K62 | 65 | Sasol Wax C80 | 88 |
| Behenyl Alcohol | 68 | Perfomalene M90 | 90 |
| Ethylene Glycol Distearate | 70 | Unilin 425 | 91 |
| Kester Wax K-72 | 72 | Unicid 350 | 92 |
| | | Polywax 600 | 94 |
| | | Stearyl Stearamide | 94 |
| | | Petrolite EP-700 | 96 |
| | | Polywax 655 | 99 |
| | | Unilin 550 | 99 |
| | | Unicid 550 | 101 |
| | | Stearamide | 101 |
| | | Polywax 725 | 104 |
| | | Unilin 700 | 105 |
| | | Polywax 850 | 107 |
| | | Behenamide | 108 |
| | | Unicid 700 | 110 |
| | | m-Toluene Sulfonamide | 110 |
| | | Unilin 1000 | 112 |
| | | Polywax 1000 | 113 |
| | | p-Toluene Sulfonamide | 135 |
| | | Kemamide EBS | 143 |

HYBRID ADDITIVE MANUFACTURING WITH DUAL PHASE-CHANGE MATERIALS

CROSS-REFERENCE TO RELATED APPLICATIONS

This application is a continuation-in-part of U.S. application Ser. No. 17/330,911, filed on May 26, 2021, and entitled "HYBRID ADDITIVE MANUFACTURING WITH DUAL PHASE CHANGE MATERIALS", now issued as U.S. Pat. No. 11,364,680.

BACKGROUND

A solid object can be manufactured in a variety of ways. One way is to begin with a substrate and to remove material therefrom so as to sculpt the desired object. This is referred to as "subtractive manufacture." Examples of machines that carry out subtractive manufacture include a lathe or router.

Another way is to build the object by adding small amounts of material at various locations. This process of accretion is generally referred to as "additive manufacture."

Some additive-manufacturing machines function much like inkjet printers. Such machines feature jets that eject various materials towards a platform to form a layer. After this layer has hardened sufficiently, the jets eject another layer.

SUMMARY

In one aspect, the invention features a method that includes manufacturing a kernel that comprises a quantity of a phase-change material and heating the thermoplastic to a temperature that is above its softening temperature. This softening temperature is greater than the phase-change material's melting temperature. The method continues with pressing this heated thermoplastic onto a contact surface of the kernel and the thermoplastic to cool to below its softening temperature. As a result, the thermoplastic assumes a profile that depends, at least in part, on the contact surface's profile. The method continues with separating the kernel from the thermoplastic.

Among the foregoing practices are those in which the softening temperature is a glass-transition temperature.

Some practices include the use of two phase-change materials. For convenience, the foregoing phase-change material will be referred to as the "first" phase-change material when necessary.

Among these practices are those in which manufacturing the kernel comprises using an additive manufacturing machine to form a multi-layer object, among which is a first layer that comprises the first phase-change material and a second phase-change material. The first and second phase-change materials are adjacent to each other within the first layer. The method continues with exposing the thus-formed object a temperature that is between the melting points of the first and second phase-change materials. This melts the second phase-change material and leaves behind the kernel.

In some of the foregoing practices, the first and second phase-change materials comprise first and second waxes, respectively.

Also among the practices that use two phase-change materials are those in which manufacturing the kernel comprises printing a composite layer that includes the first phase-change material and a second phase-change material, the first and second phase-change materials having different melting temperatures. In such practices, printing the composite layer comprises depositing the first phase-change material, depositing the second phase-change material, and depositing more of the first phase-change material after having deposited the second phase-change material.

Also among the practices of the method are those that include, prior to pressing the thermoplastic onto the contact surface, depositing a release layer onto the contact surface. In such practices, the release layer has a heat capacity that is sufficient to cause a temperature of the release layer to be below the melting temperature of the phase-change material upon completion of the step of allowing the thermoplastic to cool.

Still other practices further include spraying water onto the contact surface and pressing the thermoplastic onto the contact surface after having sprayed the water.

Some practices include having a blooming agent as a constituent of the phase-change material. Such a blooming agent that a slippery surface in response to exposure to the thermoplastic's temperature when the thermoplastic is pressed onto the contact surface.

Also among the practices are those in which the kernel comprises a residual coating of a second phase-change material having a melting temperature below that of the first phase-change material. Un such practices, a blooming agent in the second phase-change material forms a slippery surface in response to exposure to the thermoplastic's temperature when the thermoplastic is pressed onto the contact surface.

Still other practices include, prior to pressing the thermoplastic onto the contact surface, depositing a photopolymer layer onto the contact surface and curing the photopolymer layer. In such cases, the photopolymer layer assumes the profile of the contact surface.

Among the practices of the method are those in which manufacturing the kernel includes causing the contact surface to have a profile that has been selected to be transformed into another profile as a result of exposure of the contact surface to the thermoplastic while the thermoplastic is being allowed to cool below the softening temperature. The profile of the contact surface is therefor not the same as the profile that the thermoplastic is intended to have. Instead, the profile differs in a way that is selected such that the manufacturing process transforms it into the desired profile during the process itself.

In still other embodiments, manufacturing the kernel comprises causing the profile of the contact surface to be a sum of a matching component and a perturbation component, with the perturbation component having been selected to melt away in response to localized heating caused by exposure to the thermoplastic while allowing the thermoplastic to cool below the softening temperature, thereby leaving behind the matching component.

Also among the embodiments that use two phase-change materials are those in which manufacturing the kernel comprises jetting the first phase-change material and the second phase-change material to form a composite layer that comprises regions of the first phase-change material adjacent to regions of the second phase-change material/The first and second phase-change materials are jetted at corresponding first and second melting temperatures thereof and are selected such that a temperature gap separates their respective melting temperatures. This temperature gap is maximized subject to a constraint. In particular, the temperature gap is sufficiently narrow to avoid interfering with solidification of the first and second phase-change materials in the composite layer.

Other practices include two kernels. For convenience, the foregoing kernel shall be called the "first kernel." In such practices the method further comprises, after having separated the kernel from the thermoplastic, melting the first kernel and using the phase-change material to manufacture a second kernel. This phase-change material that is used to manufacture the second kernel is the very same material that comprised the first kernel.

In still other practices, the phase-change material is a constituent of first and second kernels.

Also among the practices are those in which a second kernel is made of the quantity of phase-change material.

Practices further include those in which the phase-change material comprises a wax, those in which it comprises p-toluene sulfonamide or o-toluene sulfonamide, those in which it is a material that is partially crystalline and partially amorphous but more crystalline than amorphous, and those in which the material is crystalline. Also among the practices are those in which the material is a non-wax.

Further practices of the invention are those in which manufacturing the kernel includes using an additive manufacturing machine for forming a multi-layer object on a layer-by-layer basis. Among these are practices in which forming the multi-layer object comprises receiving a feedback signal and controlling deposition of the phase-change material based at least in part on the feedback signal.

DESCRIPTION OF DRAWINGS

These and other features of the invention will be apparent from the following detailed description and the accompanying figures, in which:

FIG. 1 shows an additive-manufacturing machine;

FIG. 2 shows a composite object built by the additive-manufacturing machine of FIG. 1;

FIG. 7 shows heat flow into the build material and support material from which the composite object of FIG. 2 has been made;

FIG. 8 shows a partially-built composite object;

FIG. 9 shows a completed composite object in the process of having the support material melted away;

FIG. 10 shows a kernel that remains after the support material has been melted away;

FIG. 11 shows examples of support materials and build materials;

DETAILED DESCRIPTION

Figure 3:
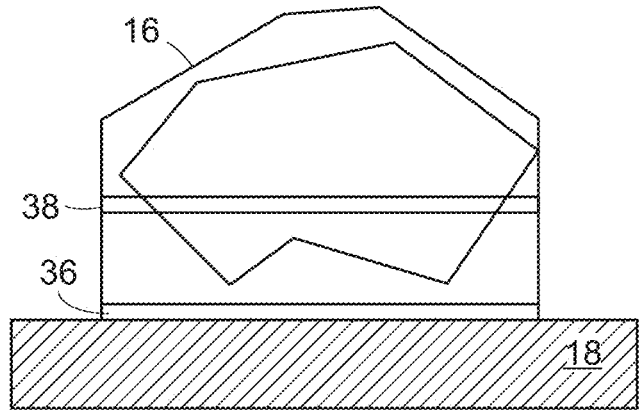
FIG. 3 shows the layers of the composite object of FIG. 3.

FIG. 1 shows an additive-manufacturing machine 10 that uses first and second jets 12, 14 to eject corresponding materials to form a composite object 16 on a platform 18. An actuator 20 causes relative motion between the platform 18 and the jets 12, 14. In the illustrated embodiment, the actuator 20 achieves such relative motion by moving platform 18. However, the actuator 20 could in principle move the jets 12, 14 or both the jets 12, 14 and the platform 18.

The additive-manufacturing machine 10 includes a profilometer 22 that provides a feedback signal to a controller 24 that controls deposition by the jets 12, 14. The additive-manufacturing machine 10 forms the composite object 16 on a layer-by-layer basis within a build chamber 26.

Referring now to FIG. 2, the composite object 16 has a first volume 28 that has been formed from a support material 30 and a second volume 32 that has been formed from a build material 34. To form such a composite object 16, the first jet 12 ejects the support material 30 and the second jet 14 ejects the build material 34. The controller 24 causes the first and second jets 12, 14 to lay down homogenous layers 36 and composite layers 38, as shown in FIG. 3.

To lay down a homogenous layer 36, the controller 24 activates only the first jet 12. As a result, a homogenous layer 36 consists of only the support material 30. To lay down a composite layer 38, the controller 24 activates only the first jet 12 at certain times and activates only the second jet 14 at other times. Plan views of exemplary composite layers 38 that result are shown in FIG. 4, FIG. 5, and FIG. 6.

Figure 4:
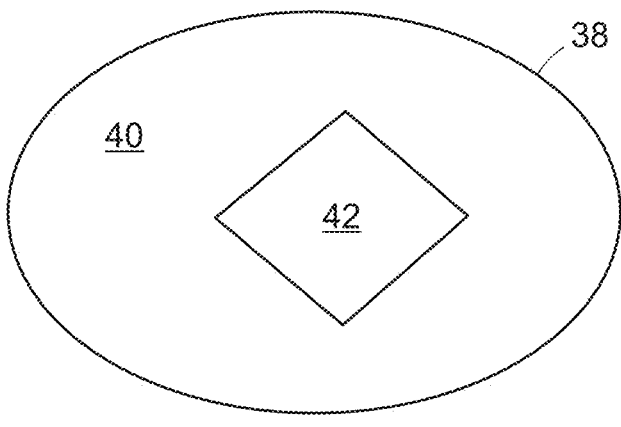
FIG. 4 shows a plan view of a composite layer from the composite object of FIG. 3.

As shown in a plan view in FIG. 4, the composite layer 38 comprises a support region 40 and a build region 42. The support region 40 is formed from the support material 30 and the build region 42 is formed from the build material 34. In the embodiment of FIG. 4, the support region 40 is disposed adjacent to an outer boundary 44 of the build region 42. In some embodiments, a finished composite object 16 appears as shown in FIG. 4, with the build region 42 being partially exposed on at least one face rather than completely encased as is shown in FIG. 9.

Figures 5, 6:
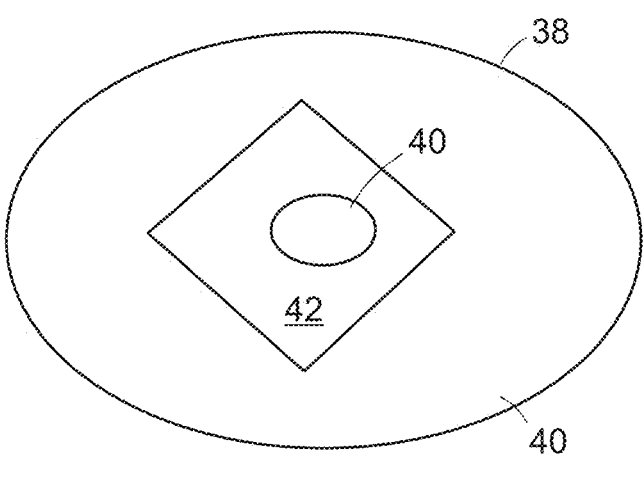
FIG. 5 shows an alternative composite layer in which the support region is adjacent to inner and outer boundaries of the build region.
FIG. 6 shows an alternative composite layer in which the build region is discontinuous.

FIG. 5 shows an alternative embodiment in which the support region 40 is disposed to be adjacent to both the outer boundary 44 and an inner boundary 46 of the build region 42. In the embodiment shown in FIG. 5, the support region 40 is a discontinuous region.

FIG. 6 shows yet another embodiment featuring an archipelagic build region 42 having both concave and convex islands of build material 34. In this embodiment, the build region 42 is thus discontinuous.

The ability to construct composite layers 38 with different distributions of build regions 42 and support regions 40 permits construction of a second volume 32 that would not otherwise be self-supporting if printed by itself. For example, if one were to attempt to build a second volume 32 having a cantilevered overhang by itself, the overhang would have a tendency to droop until the build material 34 had hardened sufficiently. The support material 30 in the first volume 28 provides the support needed to resist such deformation.

FIG. 7 shows the heat that flows into the support material 30 and into the build material 34 as a function of temperature. The build material 34 has a build-material melting point 48 and the support material 30 has a support-material melting point 50. The support-material melting point 50 is lower than the build-material melting point 48. As is apparent, there exists a temperature gap 52 between build-material melting point 48 and the support-material melting point 50. It is preferable that this temperature gap 52 be wide enough to safely melt away the support material 30 without appreciably softening the build material 34.

On the other hand, when the support material 30 and the build material 34 exit their corresponding jets 12, 14, they are in liquid form. In such cases, it is typical for these to be at temperatures that are slightly above their respective melting points 50, 48. A large temperature gap 52 would thus raise the possibility that the build material 34 and support material 30 will be ejected at temperatures that differ significantly from each other.

As shown in FIG. 4, within a composite layer 38, a support region 40 and build region 42 can easily be in close thermal communication. This raises the possibility that heat from the hotter of the two materials 30, 34 will interfere with the solidification of the cooler of the two materials 30, 34. This, in turn, creates the risk of a mixing region near the boundary between the two materials 30, 34 in which the two materials 30, 34 mix.

An optimal temperature gap 52 thus amounts to a compromise between the desire for a large temperature gap 52 to promote thermal separability of the two materials 30, 34 and a small temperature gap 52 to suppress the risk of inter-material thermal interference during the solidification of the two materials 30, 34.

FIG. 8 shows the composite object 16 at an intermediate stage of fabrication after some but not all layers have been deposited. The most recently deposited layer is a composite layer 38. Throughout the process of depositing layers, the temperature within the build chamber 26 is maintained below the support-material melting point 50.

FIG. 9 shows the completed composite object 16 being exposed to a bath temperature 56 that is within the temperature gap 52. A useful way to expose the composite object 16 to such the bath temperature 56 is to place the composite object 16 in a fluid bath 58 in which the temperature is maintained within the temperature gap 52. Examples of suitable fluids include gaseous fluids, such as air, and liquid fluids, such as water. As used herein, the word "bath" refers to exposure to any fluid (gas or liquid) whether still or moving. A useful device for use as a bath is a convection oven in which warm air is blown past the composite object 16.

In some practices, the energy used to melt the support material 30 arrives by radiation rather than convection. This can be achieved by placing the composite object 16 under a heat lamp to expose it to thermal radiation or by illuminating the composite object 16 with microwave radiation, for example by placement thereof in a microwave oven that has been set to deliver only enough energy to melt the support material 30 but not enough to melt the build material 34. In those cases, in which radiation is used, it is particularly useful to select the support material 30 to be one that is highly absorbent to the wavelength of radiation being used and to select the build material 34 to not be excessively absorbent of that wavelength, thereby avoiding inadvertently melting the build material 34.

Exposure to the bath temperature 56 causes the support material 30 to melt away while leaving behind a solid kernel 60 of build material 34, as shown in FIG. 10.

FIG. 11 shows examples of phase-change materials that are suitable for use as a support material 30 together with their respective support-material melting points 50. In addition, FIG. 11 shows examples of phase-change materials that are suitable for use as a build material 34 together with their respective build-material melting points 48. The build material 34 and the support material 30 are phase-change materials, preferably waxen, or wax-like materials, including wax. Suitable materials range from those that are purely crystalline to those that are purely amorphous with materials in between having different ratios of crystalline and amorphous composition. Suitable materials range from those that are distinctly waxy to those having a waxen nature that is sufficiently diminished so that such a material would no longer be considered to be a "wax."

It is particularly useful for the support material 30 and the build material 34 to be insoluble in each other. Such insolubility promotes a more distinct boundary between the build material 34 and the support material 30.

The kernel 60 is useful for a variety of purposes. In some embodiments, the kernel 60 is used as a mold. in others, the kernel 60 is used for investment casting.

In still other embodiments, the kernel 60 is used for thermoforming or stamping. In such a process, a material to be formed is placed over the kernel 60. Since this typically involves exertion of force against the kernel 60, it is useful for the kernel 60 to be reinforced to avoid damage resulting from this force. A suitable reinforcement can be achieved by mixing resin beads into the build material 34 or by using a wire that has been embedded into the build material 34.

In still other embodiments, the kernel 60 is used as a form for deposition of another material either by sputtering or by an electrolytic process.

Figure 12:
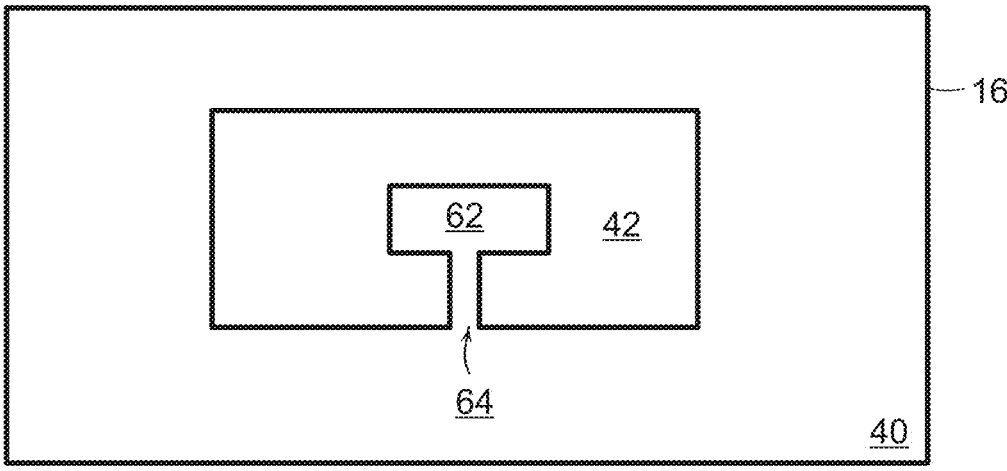
FIG. 12 shows a composite object having a composite layer as shown in FIG. 5.

The ability to deposit a composite layer 38 as shown in FIG. 5 makes it possible to construct a kernel 60 having an internal void 62, as shown in FIG. 12. Upon completion of the composite object 16, the void 62 would be filled with support material 30. Thus, such embodiments feature one or more drains 64 that allows the support material 30 to be drained way during exposure to the bath temperature 56. Such a drain 64 by having layers similar to that shown in FIG. 5 lying below the void 62.

Figure 13:
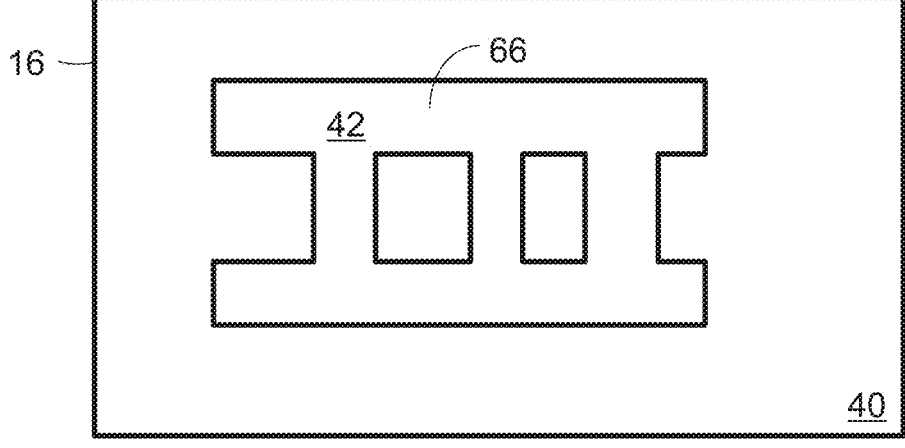
FIG. 13 shows a composite object having a composite layer as shown in FIG. 6.

The ability to deposit a composite layer 38 as shown in FIG. 6 makes it possible to construct a kernel 60 having an arch 66, as shown in FIG. 13. In such an embodiment, a drain 64 need not be supplied.

In some embodiments, the platform 18 includes perforations 68 over a tank 70. When the support material 30 melts, it flows through the perforations 68 and into the tank 70. This permits recovery of the support material 30 so that it can be used to form another composite object 16. A similar procedure permits recovery of the build material 34. For those embodiments in which the build material 34 includes reinforcement, a filter 72 between the perforations 68 and the tank 70 captures the reinforcing structures, thus purifying the build material 34.

A particularly useful feature is that the support material 30, once melted, is easily recoverable and can therefore be used again to make another composite object 16. In those cases, in which the kernel 60 is no longer needed, it is likewise possible to melt it down and recover the build material 34 so that it can be used again to make another composite object 16. In those cases, in which the build material 34 has been reinforced, it is possible to filter out the reinforcing structure from the melted build material 34 so that a purer build material 34 can be recovered.

Figure 14:
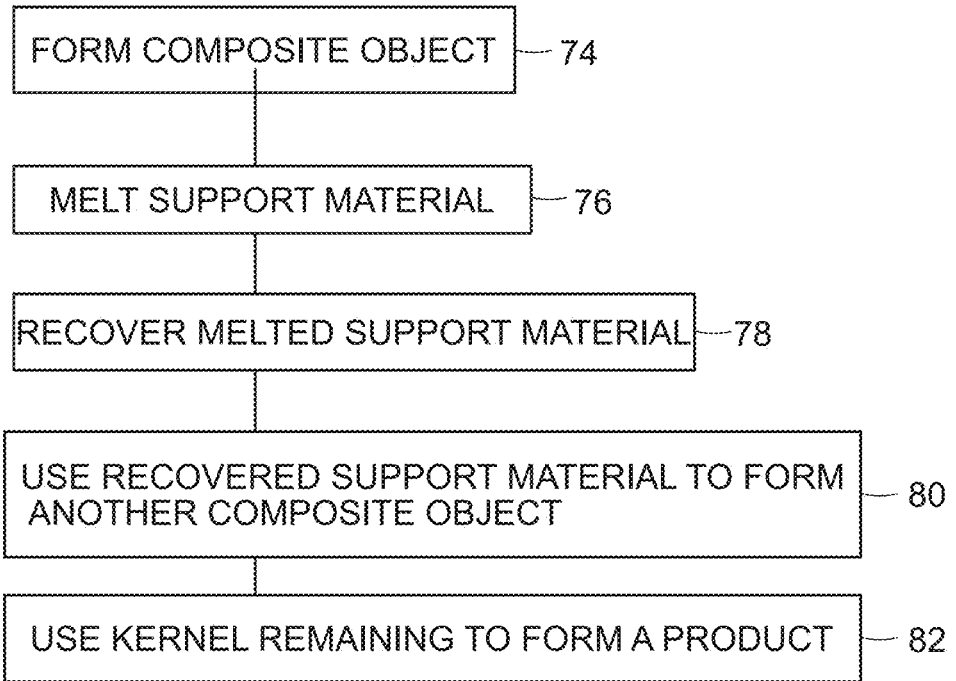
FIG. 14 is a flow chart of a method that includes melting the support material from the composite object to leave behind the kernel of FIG. 10.

FIG. 14 shows a flow chart of a method that includes forming a composite object 16 from support material 30 and build material 34 (step 74), melting the support material 30, thereby leaving a kernel 60 made of the build material 34 (step 76), recovering the melted support material 30 (step 78), using the melted support material 30 to form another composite object (step 80) and using the kernel 60 to form a product (step 82), for example by molding, casting, deposition, or sputtering of another material.

Figure 15:
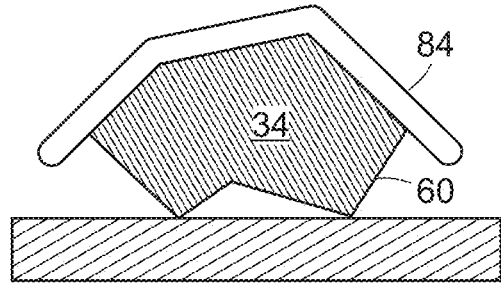
FIG. 15 shows a kernel having thermoplastic that is to be formed into a product.

In some practices, the step of using the kernel 60 to form a product (step 82) includes using the kernel 60 in connection with thermoforming a thermoplastic 84, as shown in FIG. 15.

Figure 16:
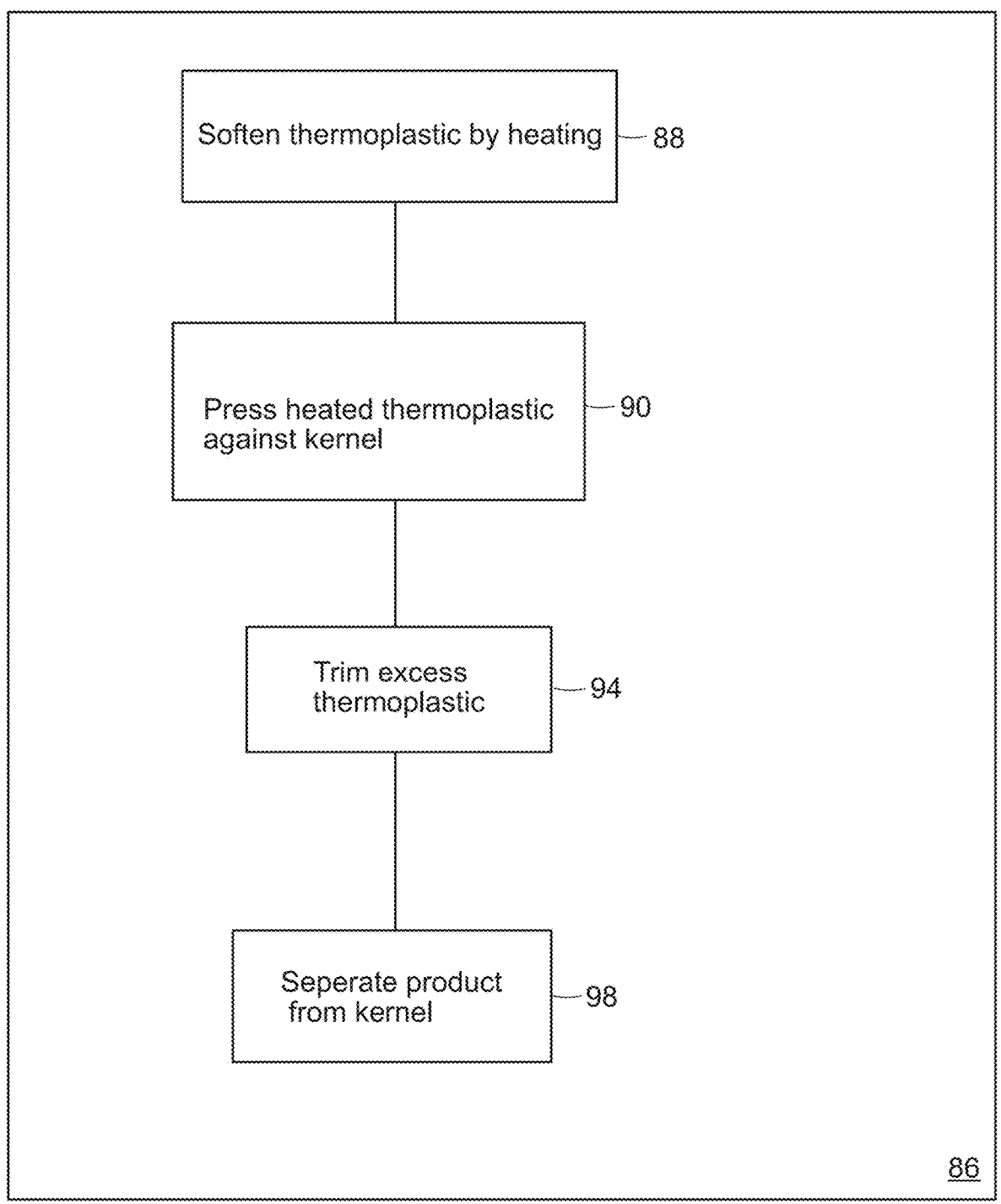
FIG. 16 shows a method for thermoforming the thermoplastic shown in FIG. 15 into a product.

The thermoplastic 84 is typically an amorphous solid that softens upon exceeding a softening temperature (e.g., a glass-transition temperature). Referring now to FIG. 16, a thermoforming process 86 begins with heating the thermoplastic beyond its glass transition temperature (step 88) and then pressing it against the kernel 60 thereby causing the kernel to heat (step 90).

Figure 17:
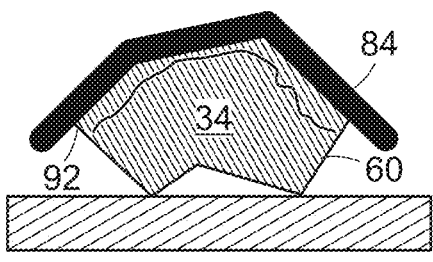
FIG. 17 shows a melted layer that results from pressing the hot thermoplastic shown in FIG. 15 against the build material.

The glass transition temperature for a typical thermoplastic 84 is generally quite high. For those cases in which the build material 34 is a wax, the thermoplastic's softening temperature is well above the build-material melting point 48. As a result, there is a pronounced tendency for the hot thermoplastic 84 to melt the kernel 60 during the pressing step (step 90). The resulting melted layer 92, which is shown in FIG. 17, causes inaccuracy in the molding process.

Fortunately, a typical thermoplastic 84 has a relatively low specific heat. As a result, there is insufficient thermal energy in the thermoplastic 84 to melt more than a very thin layer of the kernel 60. To the extent the thickness of this melted layer is below the tolerance required for the finished product, it can be ignored.

Figure 18:
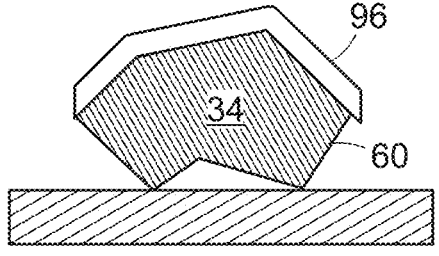
FIG. 18 shows the thermoplastic of FIG. 15 after having been trimmed.

The next step is to trim excess thermoplastic (step 94). This results in the finished product 96, as shown in FIG. 18. The trimming step is carried out by a scanning laser that has been configured to vaporize unnecessary portions of the thermoplastic without charring the underlying kernel 60.

With the product 96 now having been fully formed, the next step is to separate the product 96 from the kernel 60 (step 98). This can be carried out be melting the kernel 60 or by mechanically pulling apart the kernel 60 and the product 96.

In some cases, the melted layer 92 introduces more inaccuracy than can be tolerated. In addition, the melted layer 92 eventually solidifies again and makes separation of the kernel 60 and the product 96 more difficult.

Figure 19:
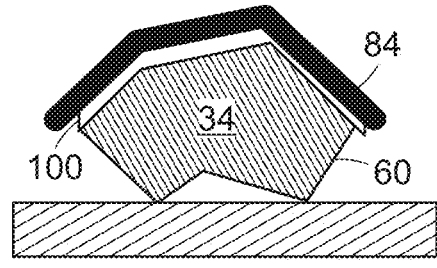
FIG. 19 shows a release layer below the thermoplastic shown in FIG. 15.
Figure 20:
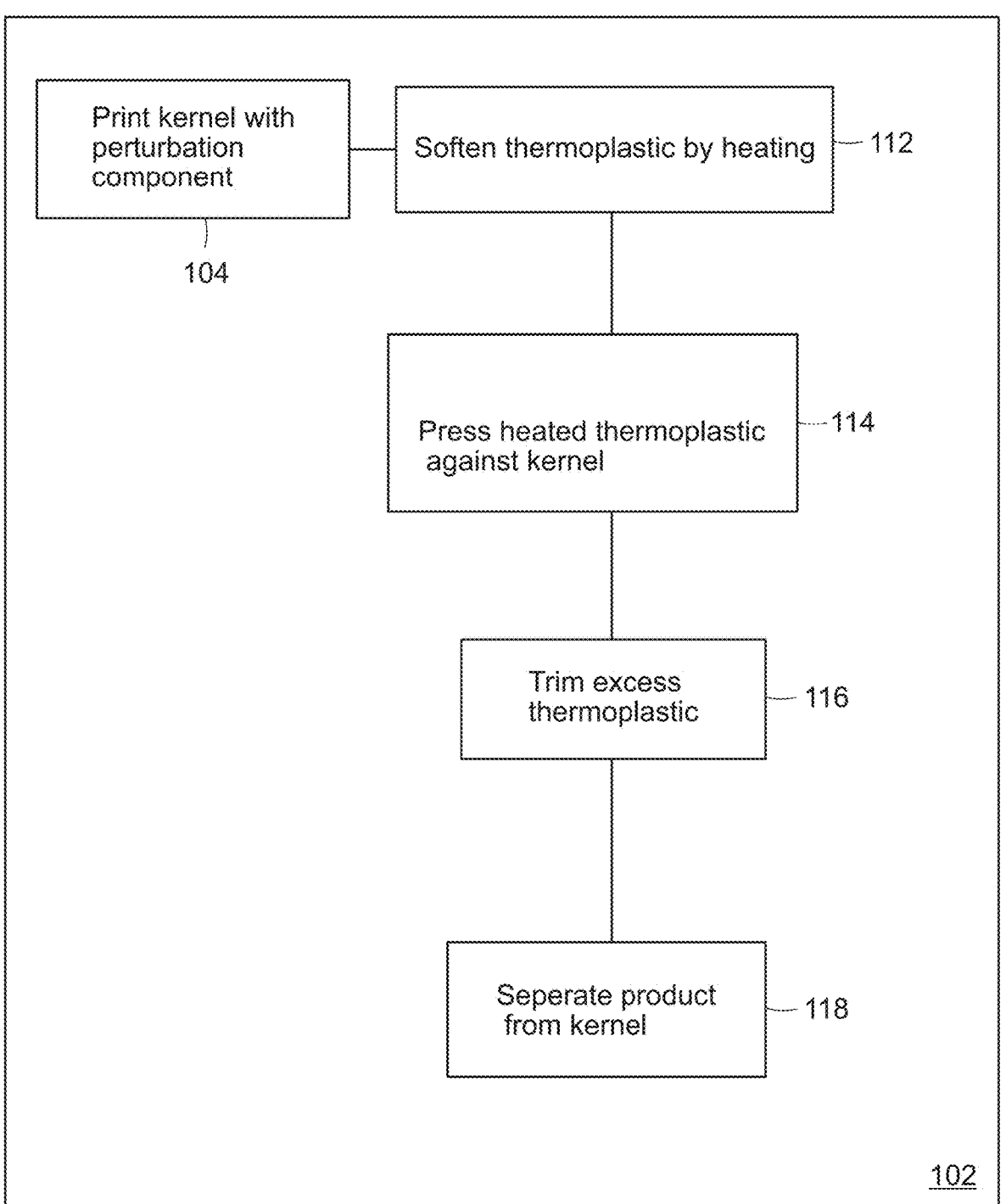
FIG. 20 shows a compensation method that relies on localized melting to remove perturbations on the contact surface of the kernel shown in FIG. 18.

To address this difficulty, it is useful to provide a release layer 100 between the kernel 60 and the thermoplastic 84, as shown in FIG. 19. The release layer 100 comprises a material with high specific heat that conforms closely to the surface of the kernel 60. As a result of its high specific heat, the release layer 100 absorbs considerable thermal energy from the heated thermoplastic 84 without undergoing a commensurate rise in temperature, thereby shielding the kernel 60 from sustaining a significant rise in temperature. Thus reduces or eliminates melting of the kernel 60 and thereby promotes accurate molding of the product 96.

Suitable materials for use as a release layer 100 include water, which can easily be sprayed onto the kernel 60 just before the heated thermoplastic 84 is set down onto the kernel 60. Water also has the property of undergoing a phase change into gas at temperatures and pressures commonly encountered in the thermoforming process 86. This phase change allows it to absorb considerable energy while making mechanical separation of the kernel 60 from the product 96 simpler.

Other materials for use as a release layer 100 features a blooming agent that rises to the surface when the material is heated so as to impart a slippery quality to the surface, thereby promoting the ability to separate the kernel 60 from the product 96.

It is often the case that a residue of support material 30 remains on the surface of the build material 34 after an attempt is made to melt it off (step 76). This residue remains in part because of a tendency of one material to adhere to another as a result of various physical phenomena.

The presence of this residue is conventionally regarded as undesirable. However, it is possible to transform this undesirable residue into a release layer 100. This is carried out by mixing the support material 30 with the blooming agent that causes the residue's surface to become slippery.

In still other cases, the release layer 100 emerges from the build material 34 in a manner analogous to efflorescence. An emergent release layer of this type is realizable by mixing blooming agent into the build material 34 itself. As the thermoplastic 84 heats the build material 34, the blooming agent present therein migrates to the surface. This imparts a slippery quality to the surface. As a result, the surface, having been rendered slippery by the blooming agent, promotes mechanical separation of the kernel 60 from the product 96.

The foregoing methods all amount to ways to compensate for the inaccuracy caused by hot thermoplastic 84 melting the build material 34. They operate primarily by stemming the flow of heat into the build material 34. However, there is another method that takes a completely different approach.

Figure 21:
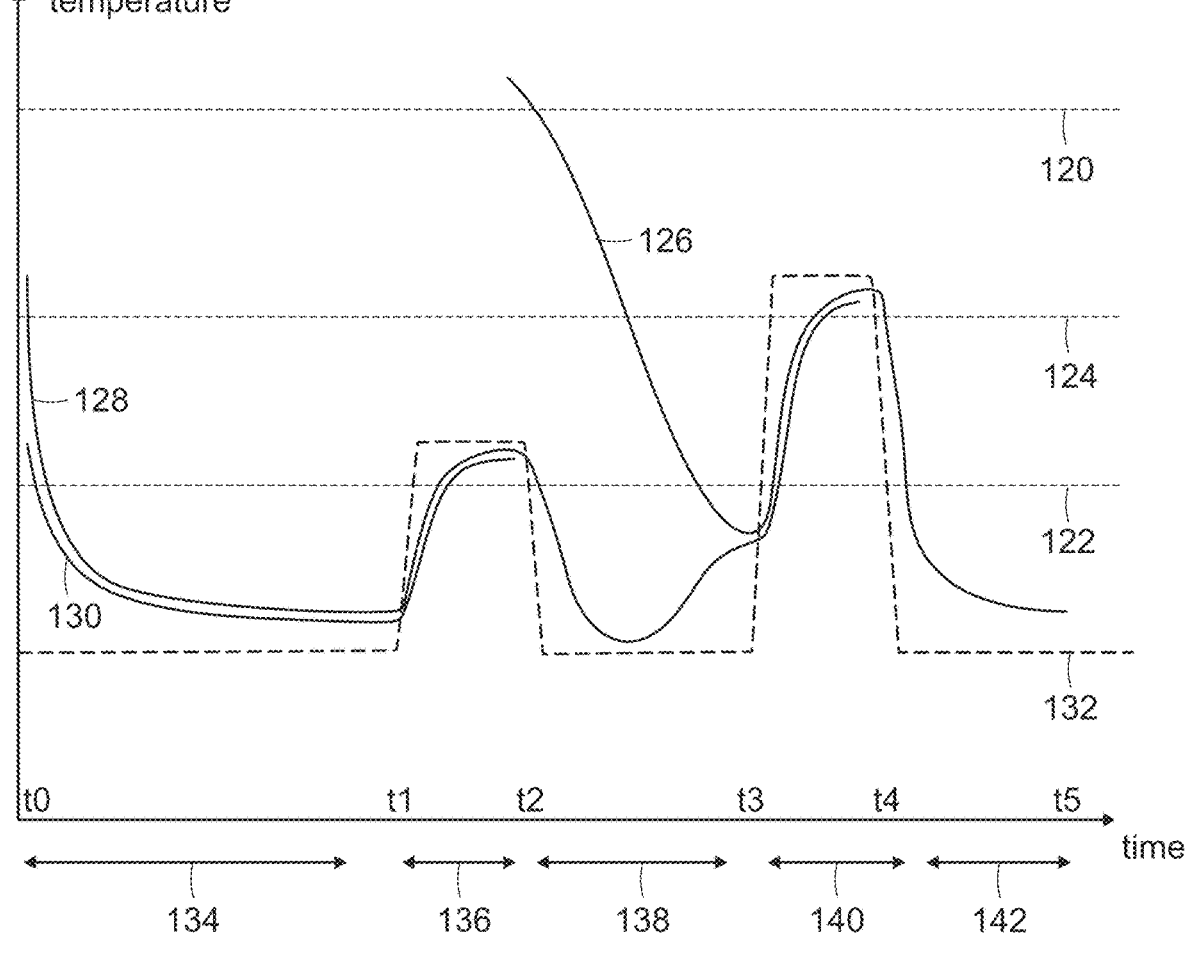
FIG. 21 shows the evolution of temperature when carrying out the method shown in FIGS. 14 and 16.

An alternative compensation method 102 includes printing a kernel 60 (step 104) which is shown in FIG. 21, so that a contact surface 106 thereof, which is the surface that ultimately contacts the thermoplastic 84, has a shape that does not match the surface to be molded onto the product 96. Instead, the contact surface 104 is equal to the sum of a matching component 108 and a perturbation component 110. The matching component's shape is consistent with that of the surface that is ultimately to be molded onto the product.

The compensation method 102 proceeds with heating the thermoplastic (step 112) and pressing the kernel 60 with the heated thermoplastic 84 to cause localized melting (step 114). By correctly choosing the perturbation component 110, it is possible to sacrifice the perturbation component 110 during the localized melting step (step 114) so as to expose only the matching component 108. In effect, the same heat that resulted in the undesired melting discussed in connection with FIG. 17 is used to cause a melted layer 92 that improves accuracy rather than diminishing it. The perturbation component 110 can thus be viewed as a specially designed melted layer 92.

The process of designing the perturbation component 110 relies on the recognition that there exists a function space whose elements are spatial functions, each of which corresponds to a possible contact surface 106 of the kernel 60. With this being the case, the act of applying the heated thermoplastic 84 to the contact surface 106 amounts to applying an operator to an operand, the operand being the function that represents the contact surface 106, so as to transform that operand into the matching component 108.

The nature of the operator is, of course, difficult to articulate. However, the operator is sufficiently deterministic so that its properties can be discovered through machine learning. Once the operator is discovered through machine learning, its inverse can likewise be discovered. With its inverse having been discovered, it is possible to determine the contact surface 104 that, when operated upon by the operator, will yield the matching component 108 by eliminating the perturbation component 110. The compensation method 102 ends with a trimming step (step 116) and a separating step (step 118) as already discussed in connection with FIG. 16.

FIG. 21 shows a horizontal time axis and a vertical temperature axis with three temperatures shown thereon. The highest of the three temperatures is the thermoplastic's softening temperature 120. This is a temperature above which the thermoplastic 84 softens and below which it retains its shape. The lowest of the three temperatures is the support-material's phase-transition 122. This is the temperature above which the support material 30 becomes liquid and below which it solidifies. The remaining one of the temperatures is the build material's phase-transition 124. This is the temperature above which the build material 34 becomes liquid and below which it solidifies.

FIG. 21 also includes curves showing time variation in thermoplastic temperature 126, build-material temperature 128, and support-material temperature 130. These show temperatures of the thermoplastic 84, the build material 34, and the support material 30, respectively, as functions of time as the procedures disclosed in connection with FIGS. 14 and 16 are carried out. Also shown in FIG. 21 is a time-varying ambient temperature 132, which is used to control the temperatures of the materials.

A printing interval 134, which corresponds to step 74 in FIG. 14, extends between a zeroth time t0 and a first time t1. During this printing interval 134, the additive-manufacturing machine 10 ejects build material 34 and support material 30 are from its jets 12, 14. As a result, the build-material temperature 128 and the support-material temperature 130 start off higher than the respective phase-transition temperatures 124, 122. Upon exposure to the ambient temperature 132, the support material 30 and the build material 34 rapidly cool below their respective phase-transition temperatures 122, 124 and thus solidify. This can be seen by the rapidly falling build-material temperature 128 and support-material temperature 130.

Consistent with step 76 of FIG. 14, a support-material removal interval 136 extends from the first time $t_1$ to a second time $t_2$. During this support-material removal interval 136, the ambient temperature 132 rises to be between the two phase-transition temperatures 122, 124, thereby melting the support material 30. The curve that shows the support-material temperature 130 thus ends since its temperature is no longer relevant. The melted support material 30 runs off and leaves the heated, but still solid, build material 34 behind. This results in the kernel 60.

One practice of the method includes lowering the ambient temperature 132 after the support-material removal interval 136, thereby increasing the rate at which the kernel 60 cools.

A thermoforming interval 138 extends between the second time $t_2$ and a third time $t_3$. This corresponds to the thermoforming process 86 shown in FIG. 16.

As indicated by the thermoplastic temperature 126, a thermoforming interval 138 begins with the thermoplastic 84 already having been pre-heated to above its softening temperature 120. The pre-heated thermoplastic 84 is applied onto the kernel 60 (step 90 in FIG. 16) at the second time $t_2$, for example, by a vacuum.

As can be seen by the plunging thermoplastic temperature 126, contact between the kernel 60 and the thermoplastic 84 rapidly cools the thermoplastic 84. As the build material 34 absorbs heat from the thermoplastic 84, the build-material temperature 128 rises, albeit more slowly than the thermoplastic temperature 126 falls because of the build material's greater thermal mass. By the third time $t_3$, the build-material 34 and the thermoplastic 84 will be near thermal equilibrium.

In some cases, the temperature of the build material 34 within the kernel's outer layer may rise briefly beyond the build material's phase-transition temperature 124 and thus melt. However, heat transfer towards the kernel's interior will constrain this rise and rapidly cool the outer layer so that it resolidifies. This detail has been omitted from the figure for clarity.

A kernel-removal interval 140 extends between the third time $t_3$ and a fourth time $t_4$. This corresponds to the step of separating the molded product from the kernel 60 (step 98 in FIG. 16). The kernel-removal interval 140 includes heating both the kernel 60 and the thermoplastic 84 to a temperature that is between the thermoplastic's softening temperature 120 and the build material's phase-transition temperature 124. Doing so melts the build material 34, which then runs off, as indicated by the end of the curve showing build-material temperature 128. What remains is the thermoplastic 84, which will have been molded into the product 96.

During a cooling interval 142, which extends from the fourth time $t_4$ to a fifth time $t_5$, the product 96 cools down to a temperature that is convenient for further handling thereof.

It is to be understood that the foregoing description is intended to illustrate and not to limit the scope of the invention, which is defined by the scope of the appended claims. Other embodiments are within the scope of the following claims.

At least one embodiment discloses a method that includes manufacturing a kernel that comprises a quantity of a phase-change material and heating the thermoplastic to a temperature that is above its softening temperature. This softening temperature is greater than the phase-change material's melting temperature. The method continues with pressing this heated thermoplastic onto a contact surface of the kernel and the thermoplastic to cool to below its softening temperature. As a result, the thermoplastic assumes a profile that depends, at least in part, on the contact surface's profile. The method continues with separating the kernel from the thermoplastic.

Among the foregoing practices are those in which the softening temperature is a glass-transition temperature.

Some practices include the use of two phase-change materials. For convenience, the foregoing phase-change material will be referred to as the "first" phase-change material when necessary.

Among these practices are those in which manufacturing the kernel comprises using an additive manufacturing machine to form a multi-layer object, among which is a first layer that comprises the first phase-change material and a second phase-change material. The first and second phase-change materials are adjacent to each other within the first layer. The method continues with exposing the thus-formed object a temperature that is between the melting points of the first and second phase-change materials. This melts the second phase-change material and leaves behind the kernel.

In some of the foregoing practices, the first and second phase-change materials comprise first and second waxes, respectively.

Also among the practices that use two phase-change materials are those in which manufacturing the kernel comprises printing a composite layer that includes the first phase-change material and a second phase-change material, the first and second phase-change materials having different melting temperatures. In such practices, printing the composite layer comprises depositing the first phase-change material, depositing the second phase-change material, and depositing more of the first phase-change material after having deposited the second phase-change material.

Also among the practices of the method are those that include, prior to pressing the thermoplastic onto the contact surface, depositing a release layer onto the contact surface. In such practices, the release layer has a heat capacity that is sufficient to cause a temperature of the release layer to be below the melting temperature of the phase-change material upon completion of the step of allowing the thermoplastic to cool.

Still other practices further include spraying water onto the contact surface and pressing the thermoplastic onto the contact surface after having sprayed the water.

Some practices include having a blooming agent as a constituent of the phase-change material. Such a blooming agent that a slippery surface in response to exposure to the thermoplastic's temperature when the thermoplastic is pressed onto the contact surface.

Also among the practices are those in which the kernel comprises a residual coating of a second phase-change material having a melting temperature below that of the first phase-change material. Un such practices, a blooming agent in the second phase-change material forms a slippery surface in response to exposure to the thermoplastic's temperature when the thermoplastic is pressed onto the contact surface.

Still other practices include, prior to pressing the thermoplastic onto the contact surface, depositing a photopolymer layer onto the contact surface and curing the photopolymer layer. In such cases, the photopolymer layer assumes the profile of the contact surface.

Among the practices of the method are those in which manufacturing the kernel includes causing the contact surface to have a profile that has been selected to be transformed into another profile as a result of exposure of the contact surface to the thermoplastic while the thermoplastic is being allowed to cool below the softening temperature. The profile of the contact surface is therefor not the same as the profile that the thermoplastic is intended to have. Instead, the profile differs in a way that is selected such that the manufacturing process transforms it into the desired profile during the process itself.

In still other embodiments, manufacturing the kernel comprises causing the profile of the contact surface to be a sum of a matching component and a perturbation component, with the perturbation component having been selected to melt away in response to localized heating caused by exposure to the thermoplastic while allowing the thermoplastic to cool below the softening temperature, thereby leaving behind the matching component.

Also among the embodiments that use two phase-change materials are those in which manufacturing the kernel comprises jetting the first phase-change material and the second phase-change material to form a composite layer that comprises regions of the first phase-change material adjacent to regions of the second phase-change material/The first and second phase-change materials are jetted at corresponding first and second melting temperatures thereof and are selected such that a temperature gap separates their respective melting temperatures. This temperature gap is maximized subject to a constraint. In particular, the temperature gap is sufficiently narrow to avoid interfering with solidification of the first and second phase-change materials in the composite layer.

Other practices include two kernels. For convenience, the foregoing kernel shall be called the "first kernel." In such practices the method further comprises, after having separated the kernel from the thermoplastic, melting the first kernel and using the phase-change material to manufacture a second kernel. This phase-change material that is used to manufacture the second kernel is the very same material that comprised the first kernel.

In still other practices, the phase-change material is a constituent of first and second kernels.

Also among the practices are those in which a second kernel is made of the quantity of phase-change material.

Practices further include those in which the phase-change material comprises a wax, those in which it comprises p-toluene sulfonamide or o-toluene sulfonamide, those in which it is a material that is partially crystalline and partially amorphous but more crystalline than amorphous, and those in which the material is crystalline. Also among the practices are those in which the material is a non-wax.

Further practices of the invention are those in which manufacturing the kernel includes using an additive manufacturing machine for forming a multi-layer object on a layer-by-layer basis. Among these are practices in which forming the multi-layer object comprises receiving a feedback signal and controlling deposition of the phase-change material based at least in part on the feedback signal.

What is claimed is:

1. A method comprising manufacturing a kernel that comprises a quantity of a phase-change material, said kernel having a contact surface, said contact surface having a profile, heating a thermoplastic past a softening temperature thereof, said softening temperature being greater than a melting temperature of said phase-change material, pressing said thermoplastic onto said contact surface of said kernel, and allowing said thermoplastic to cool to below said softening temperature, whereby said thermoplastic assumes a profile that depends, at least in part, on said profile of said kernel's contact surface, and separating said kernel from said thermoplastic.

2. The method of claim 1, wherein said phase-change material is a first phase-change material and wherein manufacturing said kernel comprises using an additive manufacturing machine to form an object, said object comprising a plurality of layers, among which is a first layer that comprises said first phase-change material and a second phase-change material, said first phase-change material being adjacent to said second phase-change material within said first layer, and after having formed said object, exposing said object to a temperature that is between a melting point of said first phase-change material and a melting point of said second phase-change material, thereby melting said second phase-change material and leaving behind said kernel.

3. The method of claim 2, wherein said first phase-change material comprises a first wax and said second phase-change material comprises a second wax.

4. The method of claim 1, wherein said phase-change material is a first phase-change material and wherein manufacturing said kernel comprises printing a composite layer that includes said first phase-change material and a second phase-change material, said first and second phase-change materials having different melting temperatures, and wherein printing said composite layer comprises depositing said first phase-change material, depositing said second phase-change material, and depositing more of said first phase-change material after having deposited said second phase-change material.

5. The method of claim 1, further comprising, prior to pressing said thermoplastic onto said contact surface, depositing a release layer onto said contact surface, wherein said release layer has a heat capacity that is sufficient to cause a temperature of said release layer to be below said melting temperature of said phase-change material upon completion of said step of allowing said thermoplastic to cool.

6. The method of claim 1, further comprising spraying water onto said contact surface and pressing said thermoplastic onto said contact surface after having sprayed said water.

7. The method of claim 1, further comprising selecting said phase-change material to include a blooming agent that forms a slippery surface in response to exposure to a temperature of said thermoplastic when said thermoplastic is pressed onto said contact surface.

8. The method of claim 1, wherein said phase-change material is a first phase-change material and said kernel comprises a residual coating of a second phase-change material having a melting temperature below that of said first phase-change material, wherein said second phase-change material includes a blooming agent that forms a slippery surface in response to exposure to a temperature of said thermoplastic when said thermoplastic is pressed onto said contact surface.

9. The method of claim 1, further comprising, prior to pressing said thermoplastic onto said contact surface, depositing a photopolymer layer onto said contact surface and curing said photopolymer layer, wherein said photopolymer layer assumes said profile of said contact surface.

10. The method of claim 1, wherein manufacturing said kernel comprises causing said contact surface to have a profile that has been selected to be transformed into another profile as a result of exposure of said contact surface to said thermoplastic while said thermoplastic is being allowed to cool below said softening temperature.

11. The method of claim 1, wherein manufacturing said kernel comprises causing said profile of said contact surface to be a sum of a matching component and a perturbation component, wherein said perturbation component is selected to melt away in response to localized heating caused by exposure to said thermoplastic while allowing said thermoplastic to cool below said softening temperature, thereby leaving behind said matching component.

12. The method of claim 1, wherein said phase-change material is a first phase-change material, wherein manufacturing said kernel comprises jetting said first phase-change material and a second phase-change material to form a composite layer that comprises regions of said first phase-change material adjacent to regions of said second phase-change material, said first and second phase-change materials being jetted at corresponding first and second melting temperatures thereof, wherein said first and second phase-change materials are selected such that said melting temperatures are separated by a temperature gap that is maximized subject to a constraint, wherein said constraint is that said temperature gap is sufficiently narrow to avoid interfering with solidification of said first and second phase-change materials in said composite layer.

13. The method of claim 1, wherein said kernel is a first kernel, wherein said method further comprises, after having separated said kernel from said thermoplastic, melting said first kernel and using said phase-change material, which was used to make said first kernel, to manufacture a second kernel.

14. The method of claim 1, wherein manufacturing said kernel comprises forming a composite object that has a first volume, which is formed from a support material, and a second volume which is formed from a build material and melting away said support material, wherein said build material is said phase-change material.

15. The method of claim 1, wherein said softening temperature is a glass-transition temperature.

16. The method of claim 1, wherein said phase-change material comprises a wax.

17. The method of claim 1, wherein said phase-change material comprises p-toluene sulfonamide or o-toluene sulfonamide.

18. The method of claim 1, wherein said phase-change material is a material that is partially crystalline and partially amorphous and wherein said phase-change material is more amorphous than crystalline.

19. The method of claim 1, wherein said phase-change material comprises a purely amorphous material.

20. The method of claim 1, wherein manufacturing said kernel comprises using an additive manufacturing machine, forming a multi-layer object on a layer-by-layer basis, wherein forming said multi-layer object comprises receiving a feedback signal from a profilometer and controlling deposition of said phase-change material based at least in part on said feedback signal.

21. The method of claim 1, wherein said kernel is a mold and wherein said thermoplastic forms a product that is molded using said mold.

22. The method of claim 1, wherein manufacturing said kernel comprises forming a composite object that has a first volume embedded in a second volume and wherein said thermoplastic assumes the profile that depends, at least in part, on a profile of said first volume.

\* \* \* \* \*